United States Patent Office 3,152,150
Patented Oct. 6, 1964

3,152,150
PRODUCTION OF GRISEOFULVIN
Alan Wilson, Ulverston, Alan H. Raper, Gainford, Gordon C. Sayer, Grange-over-Sands, Arthur P. Best, Ulverston, John Willis Richards, Birkrigg, near Ulverston, and Arthur R. Lockwood, Darlington, England, assignors to Glaxo Group Limited, Greenford, England, a British company
No Drawing. Filed Mar. 29, 1960, Ser. No. 18,243
Claims priority, application Great Britain Apr. 1, 1959
10 Claims. (Cl. 260—346.2)

This invention is concerned with improvements in or relating to the production of griseofulvin.

The antibiotic griseofulvin, which possesses valuable antifungal activity in both the horticultural and medical fields, is conveniently produced in bulk by the submerged aerobic fermentation of a griseofulvin producing organism, for example, as described in U.S. Patent No. 2,843,527. The recovery of the antibiotic from the fermentation broth, and its subsequent purification present a number of difficulties.

Since, in contrast to a number of antibiotics in current production, griseofulvin is not appreciably released into solution in the medium by the cells of the organism during culture, some 97% of the total broth activity often being retained in the mycelium, it is generally necessary to process the mycelial material rather than the aqueous medium. It has been found that the separation of the mycelial material from the aqueous medium presents considerable difficulty on the large scale due to the tendency of mycelial material to clog centrifuges and filters. In general, the broth becomes more difficult to separate, the longer the fermentation is continued.

One method of treating the fermentation broth is by roller-drying as described in copending application Serial No. 631,993, filed January 2, 1957, now U.S. Patent No. 2,986,496, a dry powder being comparatively easily obtained which may be processed to pure griseofulvin.

We have found however that it is possible, by pretreatment of the fermentation broth, to convert the mycelial material to a form which can be more readily separated from the broth. Thus, when the broth is heated, for example above 60° C., sufficient coagulation of the material occurs to produce a valuable improvement in the separation characteristics of the broth e.g. the filtration rate under given conditions. The period of heating may be comparatively short, 5 to 10 minutes at 80° C. having been found to provide a satisfactory increase in the filtration rate of a high titre fermentation broth.

Where the cells of the organism have not been lysed greatly, the preheating of the broth may enable the separation e.g. filtration to proceed satisfactorily, for example in a rotary string discharge filter without precoating or addition of filter aid. However, separation becomes increasingly difficult due to lysis as the fermentation proceeds to maximum antibiotic titre and it may then be advisable to use a precoated rotating filter, possibly accompanied by addition of filter-aid to the broth. Nevertheless, the amount of filter-aid required either as precoat or in the broth is less after than before preheating of the broth. The heating, furthermore, tends to remove fatty and waxy materials from the mycelium, which may result in less difficulties at later stages in the process.

According to the present invention therefore we provide a process for the recovery of griseofulvin from a culture broth produced by culturing a griseofulvin producing organism in a nutrient medium therefor, which comprises heating the said broth to a temperature of at least 60° C. to facilitate separation of the mycelial solid therefrom, separating said solid from said broth, extracting said separated solid with a water-miscible solvent for griseofulvin and recovering griseofulvin from the resultant extract.

In addition, separation may often be facilitated by slightly acidifying the broth, for example to pH 5.0 to 6.0, griseofulvin being generally stable between pH 3.0 and pH 8.0. The advantage of acidification is generally related to the degree of infection of the broth and under favourable conditions only one batch in ten will be acidified. Since acidification has the effect of facilitating separation it is therefore advantageously employed in conjunction with the heat treatment step, preferably before heating.

It is found that good results are obtained by separating the mycelium from the broth hot, rather than after cooling, possibly due to the more efficient removal of waxy materials. It is also found that after filtration through a conventional rotary string discharge filter, for example one of the kind sold under the name Unifloc, the filtrate still contains suspended solid and this can advantageously be recovered and added to the main mycelial felt. A comparatively easy method of recovery is to pass the filtrate through a clarifying centrifuge, for example one in which a centrifugal force of about 7000 g. is obtained.

The preferred method of separation is filtration of the broth advantageously on a rotary precoat filter without subsequent clarification.

The griseofulvin may be isolated from the mycelial felt by extraction into a solvent. There is evidence that drying of the felt before extraction leads to a better quality product but it does not extract easily unless milled and is found to be difficult to mill satisfactorily. We prefer, therefore, to extract the wet felt.

Since the antibiotic is difficultly soluble in many conventional solvents, the number of suitable extraction agents is limited. In principle the mycelial felt can be extracted with any solvent for griseofulvin but it is advantageous to choose a solvent which dissolves as little as possible of the other impurities present. In addition it is necessary to take into account the separation characteristics of the slurry of the mycelial felt in the solvent. Thus, while trichloroethylene produces a good quality extract, the solubility for griseofulvin is low (1.25%) and the filtration of the mycelial felt so extracted is somewhat slow.

In general, it is preferable to extract the wet felt with a water-miscible solvent, for example a lower alkanol, a water soluble ketone or a substituted amide since slurries of the felt in water immiscible solvents generally separate badly and such solvents are less effective extractants. Thus lower alcohols such as methanol, and substituted amides such as dimethyl formamide and dimethyl acetamide are all possible extraction solvents although none of these is as convenient as acetone which is the preferred extraction agent.

The extraction may take place at elevated temperature or in the cold but it is generally found that slightly more impurities are taken up into hot acetone whereas the solubility of griseofulvin in acetone does not vary greatly with temperature. We therefore prefer to extract in the cold when acetone is employed as extraction agent and we have found that extractions with cold acetone may often be carried out with extraction efficiencies between 75 and 96% or even up to 99.5%.

The quantity of solvent used in the extraction is important in large scale production and should preferably be kept to a minimum. We have found that in general the volume of cold acetone used is advantageously from 3–10 times that of the wet mycelial felt and preferably some 5 times that of the felt.

Under these conditions, the acetonic extracts obtained take up most of the water contained in the felt, which is usually between 10% and 15% of the volume of acetone but may be up to 25%. It is also possible to improve the colour of the extract by addition of alkali, in particular calcium hydroxide, to the felt slurry before filtration.

We have found that the amount of added calcium hydroxide for good results, lies between 2.5 and 50 grams, preferably 5.0 to 25 grams for each litre of original unfiltered broth.

The water content present during treatment with lime appears to be important for best results, and thus we prefer to adjust this content to between 5–30% and desirably to some 10–15%.

Where lime is used to decolourise a griseofulvin containing solution or suspension, it is preferable that the pH should be above 10, advantageously about 11.0. It is thus often desirable to neutralise the medium after removal of the lime. While virtually any acid may be used for neutralisation, particularly a mineral acid it is often convenient to neutralise with an acid forming an insoluble calcium salt and we have found that phosphoric acid is satisfactory for this purpose. The precipitated calcium phosphate also has some tendency to adsorb impurities. We find it convenient, however, merely to neutralise with hydrochloric acid.

After extraction and removal of the felt, the griseofulvin can be isolated and separated as far as possible from the remaining impurities. It is possible to obtain a crude product by merely reducing the bulk of the extract solution and precipitating with water but it is advantageous to remove some of the impurities, particularly waxy substances, by washing the extract with a solvent for waxy substances which is substantially immiscible with the extract and in which griseofulvin is relatively insoluble. Hydrocarbon solvents, particularly aliphatic hydrocarbons such as hexane or petroleum containing a high proportion of hexane are in general suitable for this washing step. In addition to removing waxes, this step also removes some colour from the extraction solution. This step is particularly effective when applied to extracts of griseofulvin in water-miscible solvents since the efficiency of the separation can be readily controlled by suitably adjusting the water content of the griseofulvin extract. Thus, where acetone is the extraction solvent, the extraction solution, preferably after being reduced to half its original bulk, is advantageously brought to a water-content of at least 25% (but insufficient to precipitate the griseofulvin) and preferably between 25% and 33%, advantageously 30% before washing, e.g. with petrol. We have found that in this way it is possible to separate the two phases simply, without substantial emulsion formation. In general, the volume of petrol used may be between 10 and 30% of the volume of wet acetone, preferably about 20%.

Since some of the impurities which are removable by the washing step just referred to are apparently of an acid nature, improved results may be obtained by adjusting the pH of the water-miscible solvent extract to the acid side, preferably pH 2–7, conveniently pH 3, before washing with the water-immiscible solvent.

After the washing step the griseofulvin extract may, if desired, be further treated to reduce colour, for example with an adsorbant such as alumina, charcoal, slaked lime, anion exchange resins, etc.

Griseofulvin can be recovered from the solvent extract in various ways. However, the recovery is advantageously effected by addition to the extract of a liquid miscible therewith in which griseofulvin is substantially insoluble.

The griseofulvin non-solvent is preferably water and we have found that precipitation from a purified aqueous acetonic extract by addition of water can produce crystalline albeit still impure griseofulvin in a form which is easily filtered. The quantity of water added has a bearing on the crystalline form of the griseofulvin and should not be excessive. We have found that 1½ to 2½ volumes of water added to the wet acetone (30% water) solution precipitate an easily filterable product. Carrying out the precipitation in the warm may result in the production of a more granulate form of solid.

We have additionally found that if the water employed for precipitation is alkaline the precipitated griseofulvin contains less coloured impurities. While it is possible to make the water alkaline with ammonia or an alkali-metal carbonate, for example sodium carbonate, we prefer to use an alkali metal hydroxide, for example, sodium hydroxide. A suitable pH is about 8.5.

Precaution should be taken in this step, and indeed throughout the process, that griseofulvin is not left in alkaline solution for long periods or at high temperatures as some degradation may result, particulary at high pH's.

After precipitation the griseofulvin may often vary in colour from light to dark brown and it may be desirable to submit the precipitate to further purification. Where the extraction solution has not previously been treated with a wax-solvent such as hexane it is advantageous to wash the precipitate with hexane and although washing of the precipitate is not generally as effective as extraction of the solution it is simpler in practice.

The purity of the precipitate is generally improved by washing with a solvent for the small quantities of impurities remaining and we have found that suitable washing media include dry or wet acetone, a lower alkanol, for example methanol or butanol, aqueous alkali for example of the kind used for precipitation, alcoholic solutions of alkali and hot and/or cold water. Naturally, one can wash the precipitate with far larger volumes of aqueous media in which griseofulvin is insoluble than of griseofulvin solvents such as dry acetone. Particularly marked purification is obtained with the use of methanol for the step, although washing with hot water is also very beneficial. Where the precipitate has been washed with alkali it is advisable to wash subsequently with cold water, preferably in large quantities, followed by washing with hot water and/or methanol.

An alternative to precipitation of the griseofulvin from the solvent extract thereof by addition of water or other non-solvents, is concentration of the extract solution and cooling to crystallise the antibiotic. In general a number of successive crops of crystals may be obtained by continued concentration. This method is more successfully applied to extraction solutions containing only small quantities of water, for example where a dried mycelial felt was extracted, since the concentration of water in the solution generally tends to increase and often leads to precipitation of comparatively large amounts of oily and waxy impurities with the griseofulvin. Such a crystalline precipitate may, however, be subjected to the various washing techniques described for the water-precipitated griseofulvin to produce a satisfactory solid product.

The griseofulvin produced by the steps described above is, in general, still too impure for pharmaceutical purposes, assaying generally at between 70 and 98% griseofulvin. It is, however, after drying suitable for immediate use for agricultural and horticultural purposes.

The further purification of the griseofulvin can take place in any convenient way. We have found that dissolution in a solvent such as dry acetone, methanol, cyclohexanone, dimethyl formamide or dimethyl acetamide followed by concentration and crystallisation is often suitable although where the previous isolation step was of this kind certain impurities may have solubility characteristics sufficiently similar to those of griseofulvin to reprecipitate with the antibiotic. Alternatively, the crude griseofulvin may be dissolved in a solvent and a miscible non-solvent added as in the precipitation from the primary extraction solution. In particular, the griseofulvin may be precipitated from acetone solution by addition of water, preferably demineralised and filtered to remove specks of dirt. In most cases it is extremely advantageous to treat the griseofulvin solution, with an adsorbant such as activated charcoal either in the cold or in the hot. It is often advisable to employ large volumes of adsorbant and in precipitating with water from 3% solution in acetone it is convenient to use the same weight of activated charcoal as of crude griseofulvin. We have found that where the griseofulvin is crystallised from acetone rather than precipitated with water, less charcoal may be used to produce the required purification, for example about 20% of the weight of griseofulvin present.

It is sometimes found that even after the charcoal treatment and recrystallisation described above, pink impurities remain in trace quantities in the product. We have found that the pink impurities may be removed by contacting the solution before recrystallisation with activated alumina, preferably by passing the solution in acetone through an alumina column. In general about 250 bed volumes of solution may usefully be further purified by passing through such an alumina column. It is also possible to replace some or all of the charcoal used in purification for pharmaceutical grade by alumina.

Crystallisation is, in fact, preferred to water-precipitation as a method of final purification for the above reason and also because the liquid volumes concerned are far smaller, there is no step of demineralising and filtering of water involved, and the coloured impurities generally present tend to remain more reliably in the mother liquor.

A further method of purification involves the sublimation of griseofulvin from the dried impure product.

The invention will now be described with reference to two particular embodiments thereof. It will be understood that these embodiments, while representing method which have proved of considerable utility, are only examples of particular ways of carrying out the process according to the invention.

METHOD 1

After submerged culture of a griseofulvin producing organism the whole broth, where infection of the broth is found to be sufficiently high, is acidified with a mineral acid, preferably sulphuric acid, to a pH about 5.0 and coagulated by heating for up to 3 hours conveniently between 5 and 20 minutes, at an elevated temperature, for example between 60° C. and 120° C. We prefer to heat at 80° C; at this temperature it is preferable to heat for about 10 minutes.

After coagulation, the broth is filtered hot, for example on a knife discharge precoated rotary filter. In general the filtrate contains less than 2% of the total griseofulvin and can be discarded.

The mycelial felt is then removed from the filter and extracted by stirring or other means with about 5 times its volume of acetone in the presence of enough lime to bring the pH to about 11.0. Extraction is generally substantially complete after about 2 hours. In general about 800–850 gallons of acetone and 125 lbs. of lime are used per 1000 lbs. of felt, but more lime may be added to raise the pH if desired.

The acetone slurry is then filtered on a rotary string discharge filter and the felt washed with about 250 gallons of acetone per 1000 lbs. felt. The washings are added to the extract and the whole solution is clarified through a leaf filter.

The clarified extract is neutralised with an acid, suitably hydrochloric acid, which has a soluble calcium salt. The pH is brought within the range 4–9, preferably 6.5–7.0. The neutralised extract is then concentrated to between $\frac{1}{10}$ and $\frac{1}{12}$ of its volume after neutralisation, in a forced circulation evaporator (or other suitable equipment). Concentration is continued to a final water concentration of 65–80%, preferably 70–75%.

The crystal slurry obtained is cooled below 35° C., preferably between 25 and 30° C. and filtered on a centrifuge. The centrifuge cake is given a series of slurry washes and displacement washes with methanol and with a methanol-petrol mixture. These washes are somewhat variable and not very critical in type, number, etc. The washed cake is then spun as dry as possible on the centrifuge, dug off, spread on trays and dried in an air oven at 100° C. for about 12 hours.

METHOD 2

After submerged culture of a griseofulvin producing organism, the whole broth is acidified with a mineral acid, for example sulphuric acid, to a pH about 6.0 and coagulated by heating for a few minutes, conveniently between 5 and 20 minutes, at an elevated temperature, for example between 60° C. and 120° C., preferably 80° C.

After coagulation, the broth is filtered, for example on a rotary string discharge filter, followed if necessary by clarification to recover any mycelial matter which may have passed the filter. In general the filtrate can be discarded.

The mycelial felt is then removed from the filter and extracted by stirring or other means with about 5 times its volume of acetone. Extraction is generally substantially complete after about 2 hours.

The acetone solution is then concentrated, advantageously to about half its original volume but preferably so that the griseofulvin concentration does not exceed 95% of that required to saturate the acetone extract which has been adjusted by the addition of water to adjust the water content to between 27% and 35%, preferably 30% v./v. Between $\frac{1}{10}$ and $\frac{1}{3}$ of a volume of an aliphatic hydrocarbon solvent e.g. petrol, preferably boiling at about 120° C., is then added and the mixture agitated for some time, conveniently about 30 minutes.

The hydrocarbon phase is then separated off.

The acetone phase is transferred to a large vessel and water, sufficient to produce a water content of between 70 and 80%, preferably 75% (usually between 1–5—2 volumes), added slowly over 1–2 hours and the mixture is then stirred for approximately 30 minutes.

The griseofulvin precipitated in this way is filtered off and the crude solid washed with hot water and/or methanol and filtered again. This dried solid is then of satisfactory purity for agricultural purposes and generally contains between 70 and 98% griseofulvin.

METHOD 3

The wet felt produced as in Method 1 containing about 50–65% of water and about 5.7% griseofulvin is stirred at room temperature for about an hour with about 5 volumes of acetone and sufficient water to bring the water content to about 30%. About 6 grams of lime are added initially for every litre of the original broth and the pH adjusted to about pH 11.0 with alkali, e.g. 40% caustic soda.

The extraction solution is filtered and the filter cake washed with further acetone. The combined extracts are neutralised with mineral acid, e.g. hydrochloric acid, to about pH 6.9, concentrated by atmospheric distillation to about $\frac{3}{5}$ the original volume and percolated through decolouring charcoal. The charcoal is then washed with more acetone and the combined extracts adjusted to about pH 8.5 with alkali e.g. 2 N NaOH.

This solution is then clarified, e.g. by passing through a filter paper and about 2 volumes of distilled water also at pH 8.5 are added rapidly with continuous stirring to precipitate a white microcrystalline product.

The crystals are then recovered by filtration, washed with distilled water and then with methyl alcohol and finally dried.

The crude griseofulvin can be purified further by recrystallisation from such solvents as acetone, methanol, cyclohexanone, dimethyl acetamide and dimethyl formamide. If acetone is used as solvent, it is preferable to concentrate the solution and remove successive crops of crystalline griseofulvin although precipitation with water may be used. Before crystallisation it is generally preferable to treat the solution with an adsorbant, e.g. charcoal, if desired with heating, and it is often advantageous to add as much as 1 part by weight of activated charcoal per part of griseofulvin.

If any oily or waxy materials still remain, it is possible to wash the crystalline griseofulvin with a suitable solvent, conveniently dry acetone or even to carry out a second recrystallisation. The purified griseofulvin may alternatively be subjected to a final water precipitation from acetone to alter the crystalline form.

In order that the invention may be well understood we give the following examples by way of illustration only.

Example 1

5.6 l. of griseofulvin fermentation broth, assaying at 7945 mcg./ml. was acidified to pH 6.0 with sulphuric acid and heated to 80° C. for 10 minutes. It thus contained at this stage 44.4 grams of griseofulvin.

The hot coagulated broth was filtered and the filtrate found to contain 0.59 gram of griseofulvin. This filtrate was discarded. The filtered felt was stirred for 2 hours at ambient temperature with 4 litres of acetone, and the resulting slurry filtered. The spent felt was found to contain 4.05 grams of griseofulvin.

The filtered extract was then concentrated to 1.77 litres, and water added to bring the water content to 30% v./v. 0.5 litre of petrol was added and stirred with the acetone/water extract for 30 minutes. The two phases were separated and 5.2 l. of water added with stirring over 1 hour. Crude griseofulvin was thereby precipitated and this was filtered off. The mother liquors contained 1.6 grams of griseofulvin.

The crude griseofulvin solid was then washed by slurrying with 370 mls. of methanol and again filtered. The methanol filtrate contained 1.94 grams of griseofulvin. The solid was dried, and weighed 40.4 grams, of which 90.5% was griseofulvin, making a yield of 36.5 grams in all.

The extraction efficiency over this trial, from whole broth to crude griseofulvin solid was 82% and the material balance was 100.6%.

Example 2

2500 gallons of griseofulvin fermentation broth assaying at 2848 mcg./ml. were heated to 80° C. and acidified with sulphuric acid to pH 6.0. Acidification was carried out continuously during transfer of the broth from the fermenter to the filter, the broth being acidified between 5 and 10 minutes before filtration. Prior to filtration the broth contained 32.35 kg. of griseofulvin. Filtration was carried out hot on a Unifloc rotary string discharge filter, and 890 kg. of felt assaying at 29.160 μg./gram were obtained, which thus contained 25.95 kg. of griseofulvin.

The filtration from this filter was clarified in a Laval clarifier before running to drain, and 22 kg. of solids assaying at 31,612 μg./gram and containing 0.7 kg. of griseofulvin were obtained.

The bulked solids, that is to say, the filter felt and the clarifier solids, together containing 26.65 kg. of griseofulvin were then stirred for 2 hours at ambient temperatures with 1200 gallons of acetone. The resulting slurry was filtered through a Sparkler leaf filter, followed by a displacement wash of 400 gallons of acetone.

The filtered extract was concentrated by evaporation at atmospheric pressure to 600 gallons, cooled and 70 gallons of petrol (B.P. 120° C.) added. The two liquid phases were well mixed by stirring and then separated. No griseofulvin could be detected in the decanted petrol layer.

Crude griseofulvin was then precipitated from the petrol wash concentrate by the addition of 900 gallons of water over 2 hours, stirring throughout the water addition. The solid material resulting from this procedure was filtered off, washed with 200 gallons of water at 70° C., dried. This solid weighed 20.8 kg. and assayed at 73.4% griseofulvin, gviing a yield of 15.25 kg. griseofulvin.

Example 3

Damp mycelial felt was stirred with 5 times its own volume of dry acetone, and to the mixture was added 0.8% w./v. zinc acetate (as a strong aqueous solution). The mixture was stirred for 30 minutes at room temperature and then adjusted to pH 7.5 with sodium hydroxide. The felt, plus zinc hydroxide, was removed by filtration, and the resultant extract was much improved in colour and give a much cleaner intermediate solid than did the control experiment.

A second experiment, in which the extraction was carried out under reflux, gave an identical result.

Example 4

4.100 kilos of crude griseofulvin obtained from the acetonic extraction of wet felt with the use of lime, assayed at 94.3%, i.e. containing 3.825 kg. griseofulvin, were slurried in 5 litres methanol in the cold for 15 minutes and the insoluble crystals were harvested by passing the slurry through a 21" Broadbent basket centrifuge. The mother liquors were displaced by a bed volume wash of fresh methanol and the washed solid was harvested and dried in an air oven. The yield from this washing operation was 4.056 kg. of solid. This solid was made into 3.0% w./v. solution in dry acetone (30 gallons). Into this solution was then stirred 0.600 kg. Sutcliffe Speakman SS–110 powdered charcoal in small quantities. This charcoal was then removed by filtering it off on a bed of Hyflo-Supercel filter-aid, and the filtrate was passed through a Seitz filter and sintered glass line filter to remove extraneous matter. To the clear solution was added, with stirring, an excess of water (150 gallons), which has been previously passed through a Seitz filter and sintered glass line filter. This addition of water precipitated the griseofulvin as a fine crystalline powder, which was harvested by filtration on a fine nylon cloth, washed with 26.5 gallons distilled water and dried with gentle heat in vacuo. The product of 3.426 kg. dry weight assayed at 99.7% by U.V. assay (equivalent to 3.416 kg. griseofulvin). Thus the efficiency of these purification steps was 89.5%. The final solid possessed the additional properties set out as follows:

U.V. assay (on dry) _____ percent__ 99.9
M. Pt. _____ ° C__ 218
Moisture (loss at 105° C.) _____ percent__ 0.1

Example 5

5.03 kilos of crude griseofulvin obtained from the acetone extraction of wet felt without the use of lime, assayed as 88.5% by U.V. were slurried in 8 litres methanol in the cold for 15 minutes, and the insoluble crystals were harvested by passing the slurry through at 21" Broadbent basket centrifuge. The mother liquors were displaced by a bed volume wash of fresh methanol and the washed solid was harvested and dried in an air oven. The yield from this washing operation was 4.70 kg. (U.V. assay 94.6%), which is equivalent to 4.445 kg. griseofulvin. This solid was made into 2.25% w./v. solution in dry acetone (46 gallons). Into this solution was then stirred 7.7 kg. Sutcliffe Speakman SS–110 powdered charcoal in small quantities. This charcoal was then removed by filtering it off on a bed of Hyflo-Supercel filter-aid and the filtrate was passed through a Seitz filter and sintered glass line filter to remove extraneous mater. To the clear solution was added, with stirring, an excess of water (230 gallons), which had been previously passed through a Seitz filter and sintered glass line filter. This addition of water precipitated the griseofulvin as a fine crystalline powder, which was harvested by filtration on a fine nylon cloth, washed with 26.5 gallons distilled water and dried with gentle heat in vacuo. The product of 3.561 g. dry weight assayed at 99.2% by U.V. assay (equivalent to 3.533 kg. griseofulvin). Thus the efficiency of the purification steps was 79%. The final solid possessed the additional properties set out as follows:

| | |
|---|---|
| Melting Pt. °C | 218 |
| $[\alpha]_D^{20}$ in dimethylformamide (calc. as dry) degrees | +359 |
| U.V. assay percent | 99.4 |
| Moisture (loss at 105° C.) do | 0.1 |

Example 6

740 gallons of griseofulvin fermentation broth assaying at 8000 mcg./ml. were heated to 80° C. for ten minutes without adjustment of pH. Prior to filtration the broth thus contained 26.86 kg. of griseofulvin.

The broth was filtered hot on a knife-discharge rotary filter precoated with Clarcel, a diatomaceous earth. The filtrate was discarded without further clarification. 397 kg. of filter felt was obtained, assaying at 66.400 mcg./gram and thus containing 26.31 kg. of griseofulvin.

This felt, together with 46.2 kg. of lime, was added to 650 gallons of acetone, and stirred for 2 hours at ambient temperature. The mycelial suspension was then filtered through a Feinc string discharge rotary filter, and the felt washed with 100 gallons of acetone. The acetone wash was added to the filtered extract, and the bulked liquids clarified through a Manlove Alliott leaf filter, which had been precoated with Clarcel. The solids discharged from this filter contained a negligible quantity of griseofulvin and were discharged.

The pH of the clarified extract was then adjusted to 6.8 by the addition of hydrochloric acid. The extract was concentrated in a forced circulation evaporator operating at atmospheric pressure, from 745 gallons to 67.5 gallons, achieving a final water content of 74%.

The crystal slurry was cooled to 30° C. and filtered on centrifuge. The centrifuge cake was dug off, slurried in 3 gallons of methanol, and centrifuged. It was next slurried in a mixture of 11.7 gallons of petrol (B.P 120° C.) and 1 gallon of methanol, centrifuged, and displacement washed with 3 gallons of methanol. This was followed by a 6.4 gallon methanol slurry wash and a 1.6 gallon methanol displacement wash.

The solid material, after spinning on the centrifuge was dried in an air oven for 12 hours at 100° C. After drying, the solid weighed 22.08 kg. and assayed at 99.1% griseofulvin, giving a yield of 21.88 kg. of griseofulvin.

Example 7

6.82 kilograms of filtered heat coagulated griseofulvin felt containing 3.9 kilograms of water and 434 grams of griseofulvin were intimately mixed at 20° C. with 36 litres of acetone to which 360 grams of calcium chloride had been added as a concentrated aqueous solution. The pH of this mixture was adjusted to 10.0 by the addition of 40% w./v. sodium hydroxide solution and agitation continued for two hours.

Filtration of this mixture and acetone washing of the filter cake yielded 44 litres of acetonic solution.

The aqueous acetone extract was adjusted to pH 6.5 by the addition of 10% v./v. phosphoric acid solution and concentrated to 31 litres by atmospheric distillation, achieving a final water content of 30%.

The concentrated extract was acidified with 50% v./v. phosphoric acid solution to pH 3.5 and clarified by filtration through a bed of Hyflo-Supercel filter aid. The filtrate was stirred with 3 litres of petrol (B.P. 60° to 80° centigrade) for thirty minutes and two liquid phases separated. The upper petrol layer was discarded.

The petrol washed concentrate was percolated through an intimate mixture of 270 grams Sutcliffe Speakman SS–110 powdered charcoal and 270 grams Hyflo-Supercel filter aid. The decolourised filtrate was adjusted with 40% w./v. potassium hydroxide solution to pH 8.5 and passed through a Seitz filter and sintered glass line filter to remove extraneous matter.

To the clear solution was added with stirring an excess of water (48 litres) which had been previously adjusted to pH 8.5 and passed through a Seitz filter and sintered glass line filter. This addition of water precipitated the griseofulvin as a fine crystalline powder, which was harvested by filtration, washed with acidulated water and then copiously washed with distilled water until the washes were neutral. The griseofulvin was then washed with 5 litres boiling water followed by a slurry wash in 250 millilitres methanol and dried at 35° centigrade in vacuo. 427 grams of griseofulvin of 98.5% purity were obtained.

Example 8

A 3% solution of crude griseofulvin in acetone were treated with Sutcliffe Speakman SS–110 powdered charcoal to give a solution colour on the Lovibond Scale of 1.4 Red and 2.4 Yellow. 250 bed volumes of this solution were then passed through a column of Spence U.G.I. grade alumina, the contact time being 0.7 minute and the collected fractions precipitated with 3 volumes of neutral demineralised water. The solid so produced had a Lovibond solution colour of 0.7 Red and 2.1 Yellow.

We claim:

1. In a process for the production of griseofulvin wherein a culture broth containing mycelial solid is produced by the submerged culture of a griseofulvin-producing organism in a nutrient medium therefor, said mycelial solid is separated from said culture broth, said separated solid is extracted with a solvent for griseofulvin, and griseofulvin is recovered from the resultant extract, the step of: heating said culture broth prior to separation of said mycelial solid therefrom to a temperature of at least 80° C. to facilitate the subsequent separation.

2. A process as claimed in claim 1 in which said mycelial solid is separated from said culture broth by filtratration.

3. A process as claimed in claim 2 in which said culture broth is heated to a temperature between 80° C. and 120° C.

4. In a process as claimed in claim 2, the step of treating the solvent extract of griseofulvin with calcium hydroxide.

5. In a process as claimed in claim 2, the step of treating the separated mycelial solid with calcium hydroxide before extraction with the solvent.

6. A process as claimed in claim 2 in which the culture broth is at acid pH during heating to facilitate separation of said mycelial solids.

7. A process as claimed in claim 2 in which said culture broth is heated for from five minutes to three hours.

8. A process as claimed in claim 2 in which said solvent for griseofulvin is water-miscible.

9. A process as claimed in claim 2 in which said solvent for griseofulvin is acetone.

10. A process as claimed in claim 9 in which the volume of acetone used is from 3 to 10 times the volume of the wet mycelial solid.

References Cited in the file of this patent

UNITED STATES PATENTS 2,843,527 Rhodes et al. _____ July 15, 1958

FOREIGN PATENTS 784,618 Great Britain _____ Oct. 9, 1957

OTHER REFERENCES

MacMillan, J. Chem. Soc. (London) (1953), pp. 1697–1702.

MacMillan, J. Chem. Soc. (1954), pages 2585–7.